United States Patent
Sunaga

(10) Patent No.: US 7,817,975 B2
(45) Date of Patent: Oct. 19, 2010

(54) WIRELESS COMMUNICATION SYSTEM, WIRELESS COMMUNICATION TERMINAL, AND WIRELESS COMMUNICATION METHOD

(75) Inventor: Tohru Sunaga, Kawasaki (JP)

(73) Assignee: Kyocera Corporation, Kyoto (JP)

( * ) Notice: Subject to any disclaimer, the term of this patent is extended or adjusted under 35 U.S.C. 154(b) by 1114 days.

(21) Appl. No.: 11/401,430

(22) Filed: Apr. 10, 2006

(65) Prior Publication Data
US 2006/0240792 A1    Oct. 26, 2006

(30) Foreign Application Priority Data
Apr. 26, 2005   (JP) ............................ P2005-128118

(51) Int. Cl.
*H04B 1/18* (2006.01)
(52) U.S. Cl. .................. 455/165.1; 455/260; 455/550.1
(58) Field of Classification Search .................... 455/74, 455/76, 150.1, 161.1, 165.1, 255–260, 550.1, 455/552.1, 553.1
See application file for complete search history.

(56) References Cited

U.S. PATENT DOCUMENTS

| | | | | |
|---|---|---|---|---|
| 3,955,140 A | * | 5/1976 | Stephens et al. | ........... 455/11.1 |
| 4,878,228 A | * | 10/1989 | Takahashi | ................... 375/211 |
| 5,734,982 A | * | 3/1998 | Endo et al. | ................... 455/450 |

(Continued)

FOREIGN PATENT DOCUMENTS

| JP | 62243433 A | 10/1987 |
|---|---|---|
| JP | 01136432 A | 5/1989 |
| JP | 08316898 A | 11/1996 |

(Continued)

OTHER PUBLICATIONS

Katsumi Sakai et al., "Study of Multi-point Repeater System with Multiple Input Multiple Output Method" IEICE Technical Report, vol. 101, No. 682, pp. 125-132, Feb. 27, 2002 (with English abstract).

(Continued)

*Primary Examiner*—Nhan Le
(74) *Attorney, Agent, or Firm*—Hogan Lovells US LLP

(57) ABSTRACT

A wireless communication system includes: a base station; a first wireless communication terminal that receives a first signal from the base station; and a second wireless communication terminal that receives a second signal from the base station. The first signal is to be used by the second wireless communication terminal. The first wireless communication terminal includes: a transmitting unit that transmits the first signal to the second wireless communication terminal. The second wireless communication terminal includes: a receiving unit that receives the first signal from the first wireless communication terminal; and a signal synthesizing unit that receives the first signal from the receiving unit and performs at least one synthesis based on the first signal and the second signal.

2 Claims, 4 Drawing Sheets

U.S. PATENT DOCUMENTS

| | | |
|---|---|---|
| 7,092,434 B2 | 8/2006 | Moon et al. |
| 7,139,527 B2 | 11/2006 | Tamaki et al. |
| 7,319,714 B2 | 1/2008 | Sakata et al. |
| 7,463,673 B2 | 12/2008 | Fujii et al. |
| 2001/0018336 A1 | 8/2001 | Okajima et al. |
| 2004/0229563 A1 | 11/2004 | Fitton et al. |

FOREIGN PATENT DOCUMENTS

| | | |
|---|---|---|
| JP | 10163984 A | 6/1998 |
| JP | 2000101502 A | 4/2000 |
| JP | 2002-044051 | 2/2002 |
| JP | 2003008496 A | 1/2003 |
| JP | 2003198442 A | 7/2003 |
| JP | 2003332963 A | 11/2003 |
| JP | 2004165935 A | 6/2004 |
| JP | 2004254308 A | 9/2004 |
| JP | 2005192185 A | 7/2005 |
| JP | 2005229524 A | 8/2005 |

OTHER PUBLICATIONS

Hui Shi et al., "Capacity Enhancement of Cooperative Relay Technique: MIMO Transmission" Proceedings of the IEICE Conference 2005, Communication 1, p. 537, Mar. 7, 2005 (with partial English translation).

Japanese language office action and its English language translation for corresponding Japanese application No. 2005-128118 lists the references above.

* cited by examiner

WIRELESS COMMUNICATION SYSTEM, WIRELESS COMMUNICATION TERMINAL, AND WIRELESS COMMUNICATION METHOD

BACKGROUND OF THE INVENTION

1. Field of the Invention

The present invention generally relates to a wireless communication system, a wireless communication terminal and a wireless communication method.

Priority is claimed on Japanese Patent Application No. 2005-128118, filed Apr. 26, 2005, the contents of which are incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

A typical wireless communication system may be a MIMO (Multi Input Multi Output) system that is designed to improve a rate of communication between a mobile station and a base station. In the MIMO system, each of the mobile station and the base station has a plurality of antenna elements for transmitting and receiving radio waves so as to establish a plurality of communication paths or propagation paths between the mobile station and the base station. A first one of the mobile station and the base station may transmit one or more signals or one or more sets of data to a second one thereof. In this case, the first one serves as a transmitter station and the second one serves as a receiver station. For example, the plural antenna elements of the base station transmit plural sets of data, respectively. The plural sets of data are different and separate from each other. The different and separate sets of data are mixed with each other on the propagation paths. The plural antenna elements receive the mixed sets of data and separate the mixed sets into the original plural sets of data that are separate and different from each other. This conventional technique is disclosed in Japanese Unexamined Patent Application, First Publication, No. 2002-44051. In the MIMO system, each of a transmitter station and a receiver station has a plurality of antenna elements. Other typical examples of the wireless communication system may include, but are not limited to, a MISO (Multi Input Single Output) system and a SIMO (Single Input Multi Output) system. In the MISO system, the transmitter station has a plurality of antenna elements and the receiver station has a single antenna element. In the SIMO system, the transmitter station has a single antenna element and the receiver station has a plurality of antenna elements.

The number of propagation paths or channels that are spatially established between the transmitter and receiver stations depends on the number of the antenna elements of the transmitter and receiver stations. In order to increase the number of the paths, it is necessary to increase the number of the antenna elements while increasing the scale or dimension of a set of the antenna elements. Increasing the scale or dimension of the set of the antenna elements increases the restriction on mounting the antenna elements on a communication terminal such as a mobile terminal and also increases a manufacturing cost thereof. When the plural antenna elements are provided on a communication terminal having a small size, it may be necessary to reduce a distance between the antenna elements so as to satisfy the restriction condition for mounting the antenna elements. Reducing the distance between the antenna elements increases a correlation between the antenna elements, thereby making it difficult to identify spatial channels that transmit or propagate radio waves and reducing an amount of information that can be actually transmitted. It is desired to ensure that the number of the spatial propagation paths between the transmitter and receiver stations be independent from the number of the antenna elements of the transmitter and receiver stations.

In view of the above, it will be apparent to those skilled in the art from this disclosure that there exists a need for an improved system, method and/or apparatus. This invention addresses this need in the art as well as other needs, which will become apparent to those skilled in the art from this disclosure.

SUMMARY OF THE INVENTION

Accordingly, it is a primary object of the present invention to provide a wireless communication system.

It is another object of the present invention to provide a wireless communication terminal.

It is a further object of the present invention to provide a wireless communication method.

In accordance with a first aspect of the present invention, a wireless communication system includes: a base station; a first wireless communication terminal that communicates with the base station through a first signal; and a second wireless communication terminal that communicates with the base station through a second signal. The first signal is to be used by the second wireless communication terminal. The first wireless communication terminal includes: a transmitting unit that transmits the first signal to the second wireless communication terminal. The second wireless communication terminal includes: a receiving unit that receives the first signal from the first wireless communication terminal; and a signal synthesizing unit that receives the first signal from the receiving unit and performs at least one synthesis based on the first signal and the second signal.

Preferably, the transmitting unit may further include: a first detecting unit that detects a first radio frequency from a plurality of predetermined radio frequencies. The first radio frequency is not in use but is available to the second wireless communication terminal. The transmitting unit transmits the first signal at the first radio frequency to the second wireless communication terminal. The receiving unit may further include: a second detecting unit that detects a second radio frequency. The receiving unit receives the first signal at the second radio frequency from the first wireless communication terminal.

In accordance with a second aspect of the present invention, a wireless communication terminal communicates with a base station and a different wireless communication terminal. The wireless communication terminal includes: a base station communication unit that receives a first signal from the base station; and a transmitting unit that receives the first signal from the base station communication unit and transmits the first signal to the different wireless communication terminal. The first signal is to be used by the different wireless communication terminal.

Preferably, the transmitting unit may further include: a first detecting unit that detects a first radio frequency from a plurality of predetermined radio frequencies. The first radio frequency is not in use but is available to the different wireless communication terminal. The transmitting unit transmits the first signal at the first radio frequency to the different wireless communication terminal.

In accordance with a third aspect of the present invention, a wireless communication terminal communicates with a base station and a different wireless communication terminal. The wireless communication terminal includes: a base station communication unit that receives a first signal from the base station; a receiving unit that receives a second signal from the different wireless communication terminal, the second signal being not in use but available to the wireless communication terminal; and a signal synthesizing unit that receives the second signal from the receiving unit and performs at least one synthesis based on the first signal and the second signal.

Preferably, the receiving unit may further include: a second detecting unit that detects a first radio frequency. The receiving unit receives the second signal at the first radio frequency from the different wireless communication terminal.

In accordance with a fourth aspect of the present invention, a wireless communication terminal communicates with a base station and a different wireless communication terminal. The wireless communication terminal includes: a base station communication unit that receives first and second signals from the base station, the first signal being used by the different wireless communication terminal, the second signal to be used by the wireless communication terminal; a transmitting unit that receives the first signal from the base station communication unit and transmits the first signal to the different wireless communication terminal; a receiving unit that receives a third signal from the different wireless communication terminal, the third signal being not in use but available to the wireless communication terminal; and a signal synthesizing unit that receives the second signal from the receiving unit and performs at least one synthesis based on the second signal and the third signal.

Preferably, the transmitting unit may further include: a first detecting unit that detects a first radio frequency from a plurality of predetermined radio frequencies. The first radio frequency is not in use but is available to the different wireless communication terminal. The transmitting unit transmits the first signal at the first radio frequency to the different wireless communication terminal.

Preferably, the receiving unit may further include: a second detecting unit that detects a second radio frequency. The receiving unit receives the third signal at the second radio frequency from the different wireless communication terminal.

In accordance with a fifth aspect of the present invention, a wireless communication method includes: transmitting a first signal from a base station through a first wireless communication terminal to a second wireless communication terminal, the first signal to be used by a second wireless communication terminal; transmitting a second signal from the base station directly to the second wireless communication terminal; and performing, by the second wireless communication terminal, at least one synthesis based on the first signal and the second signal.

Preferably, the wireless communication method may further include: detecting, by the first wireless communication terminal, a first radio frequency from a plurality of predetermined radio frequencies, the first radio frequency being not in use but available to the second wireless communication terminal, so as to transmit the first signal at the first radio frequency from the first wireless communication terminal to the second wireless communication terminal.

Preferably, the wireless communication method may further include: detecting, by the second wireless communication terminal, a second radio frequency. The receiving unit receives the first signal at the second radio frequency from the first wireless communication terminal.

Each of the plural communication terminals can establish not only a direct communication path between each of the plural communication terminals and the base station but also another indirect communication path through a different one of the plural communication terminals between each of the first and second communication terminals and the base station. Namely, each of the plural communication terminals can establish the indirect communication path that uses a different one of the plural communication terminals. This configuration of the wireless communication system increases the number of the communication paths without increasing the number of the antenna elements thereof. The configuration of the communication terminal can establish the spatial paths between the communication terminal and the base station independently from the number of the antenna elements of the communication terminal. Increasing the number of the communication paths without increasing the number of the antenna elements of the communication terminal increases the rate of communication without increasing the scale or size of the communication terminal.

These and other objects, features, aspects, and advantages of the present invention will become apparent to those skilled in the art from the following detailed descriptions taken in conjunction with the accompanying drawings, illustrating the embodiments of the present invention.

BRIEF DESCRIPTION OF THE DRAWINGS

Referring now to the attached drawings which form a part of this original disclosure.

DETAILED DESCRIPTION OF THE INVENTION

Selected embodiments of the present invention will now be described with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
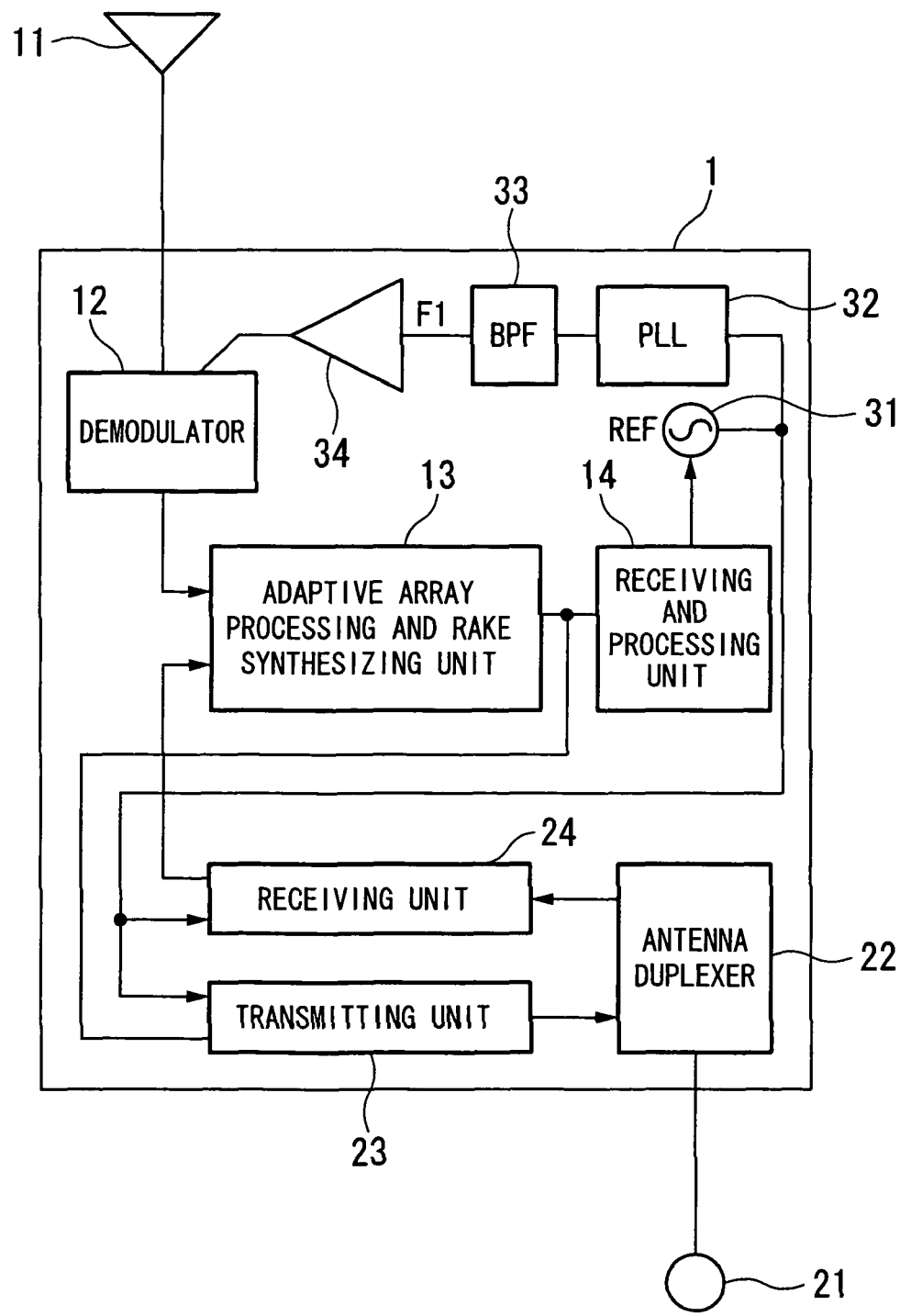
FIG. 1 is a block diagram illustrating a configuration of a wireless communication terminal in accordance with a first embodiment of the present invention.
Figure 2:
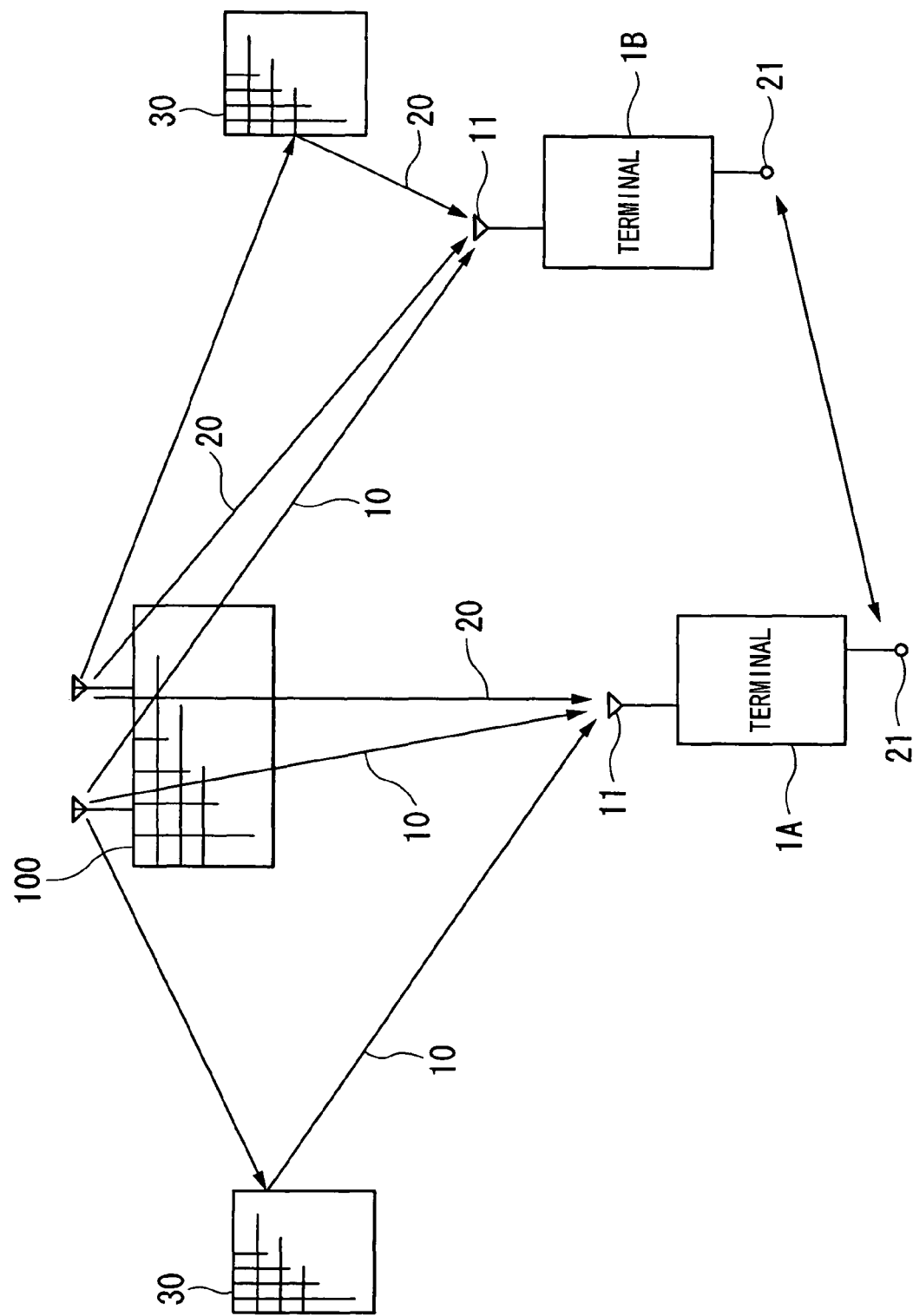
FIG. 2 is a diagram illustrating a configuration of a wireless communication system including the wireless communication terminals of FIG. 1 in accordance with the first embodiment of the present invention.

FIG. 1 is a block diagram illustrating a configuration of a wireless communication terminal in accordance with the first embodiment of the present invention. FIG. 2 is a diagram illustrating a configuration of a wireless communication system including the wireless communication terminals of FIG. 1 in accordance with the first embodiment of the present invention. A wireless communication system of FIG. 2 is a MIMO system that includes a MIMO base station 100 and a plurality of communication terminals 1. The communication terminal 1 has a first antenna 11 that includes a single antenna element for wireless communication with the MIMO base station 100. The communication terminal 1 includes the following elements. A demodulation unit 12 is electrically coupled to the first antenna 11 to receive a first signal from the first antenna 11 and demodulate or convert the received first signal to a base band signal. An adaptive array processing and rake-synthesizing unit 13 is electrically coupled to the demodulation unit 12 to receive the base band signal from the demodulation unit 12.

The communication terminal 1 has a second antenna 21 for wireless communication with one or more other communication terminals 1 included in the MIMO system. For example, as shown in FIG. 2, a communication terminal 1A performs a wireless-communication with a communication terminal 1B through the second antennas 21. The communication terminal 1 also includes an antenna duplexer 22 that is electrically coupled to the second antenna 21 to switch the second antenna 21 between a transmitting mode and a receiving mode. The communication terminal 1 further includes a receiving unit 24 that is electrically coupled to the antenna duplexer 22 to receive a second signal from the second antenna 21 through the antenna duplexer 22. The receiving unit 24 demodulates the received second signal and transmits the demodulated signal to the adaptive array processing and rake-synthesizing unit 13. The receiving unit 24 is further electrically coupled to the adaptive array processing and rake-synthesizing unit 13 so as to transmit the received second signal to the adaptive array processing and rake-synthesizing unit 13.

The adaptive array processing and rake-synthesizing unit 13 receives the base band signal from the demodulation unit 12 and the demodulated signal from the receiving unit 24 so as to perform an adaptive array processing and a rake synthesis based on the base band signal and the demodulated signal, thereby generating a processed signal. When the communication terminal 1A does not receive any signal from the communication terminal 1B and the adaptive array processing and rake-synthesizing unit 13 receives only the base band signal from the demodulation unit 12 without receiving any signal from the receiving unit 24, the adaptive array processing and rake-synthesizing unit 13 performs the rake synthesis of the base band signal.

The communication terminal 1 also includes a transmitting unit 23 that is electrically coupled to the adaptive array processing and rake-synthesizing unit 13 so as to receive a processed signal from the adaptive array processing and rake-synthesizing unit 13 and modulate the processed signal. The transmitting unit 23 transmits the modulated signal through the antenna duplexer 22 to the second antenna 21. When the processed signal that is generated by the adaptive array processing and rake-synthesizing unit 13 may include a signal for the communication terminal 1A and another signal for the other communication terminal 1B, the transmitting unit 23 modulates only the other signal for the other communication terminal 1B and transmits the same through the antenna duplexer 22 to the antenna 21. As described above, the receiving unit 24 demodulates the received second signal and transmits the demodulated signal to the adaptive array processing and rake-synthesizing unit 13.

As shown in FIG. 2, the MIMO base station 100 transmits a first desired radio wave 10 and a second desired radio wave 20 so that each of the communication terminals 1A and 1B receives both the first and second desired radio waves 10 and 20. Parts of each of the first and second desired radio waves 10 and 20 are propagated directly to the communication terminals 1A and 1B. Other parts of each of the first and second desired radio waves 10 and 20 are propagated to obstructions 30 and scattered thereby and then propagated to the communication terminals 1A and 1B. The first antenna 11 of each of the communication terminals 1A and 1B receives both the first and second desired radio waves 10 and 20 from the MIMO base station 100. For example, the communication terminal 1B receives the first and second desired radio waves so that the antenna 21 of the communication terminal 1B transmits only the signal for the communication terminal 1A to the communication terminal 1A. The antennal 21 of the communication terminal 1A receives the signal for the communication terminal 1A from the communication terminal 1B. The antennal 11 of the communication terminal 1A also receives the first and second desired radio waves from the MIMO base station 100. The adaptive array processing and rake-synthesizing unit 13 of the communication terminal 1A performs the adaptive array processing and the rake synthesis for estimation on a MIMO channel based on those processes.

With reference back to FIG. 1, the communication terminal 1 also includes a receiving and processing unit 14 that is electrically coupled to the adaptive array processing and rake-synthesizing unit 13 to receive the signal from the adaptive array processing and rake-synthesizing unit 13 and perform a predetermined processing of the received signal, thereby generating a synchronization signal. The communication terminal 1 also includes an oscillator 31 that is electrically coupled to the receiving and processing unit 14 to receive the synchronization signal from the receiving and processing unit 14 and generates a reference signal based on the synchronization signal so that the reference signal synchronizes with another reference signal that is used in the MIMO base station 100. The communication terminal 1 further includes a PLL (Phase Locked Loop) 32 that is electrically coupled to the oscillator 31 to receive the reference signal from the oscillator 31. The communication terminal 1 further includes a BPF (band-pass filter) 33 that is electrically coupled to the PLL 32 to receive an output from the PLL 32 and generate a signal of a predetermined frequency f1. The communication terminal 1 further includes an amplifier 34 that is electrically coupled to the BPF 33 to receive the signal of the predetermined frequency f1 from the BPF 33 and generates an amplified signal. The amplifier 34 is also electrically coupled to the demodulation unit 12 to transmit the amplified signal to the demodulation unit 12. The oscillator 31 is also electrically coupled to the transmitting and receiving units 23 and 24 to transmit the reference signal thereto.

Sequential operations of the transmitting unit 23 and the receiving unit 24 will be described with reference to FIGS. 3 and 4, assuming that the communication terminal 1A and one or more other communication terminals 1(B) are on the current communications with the MIMO base station 100.

Figure 3:
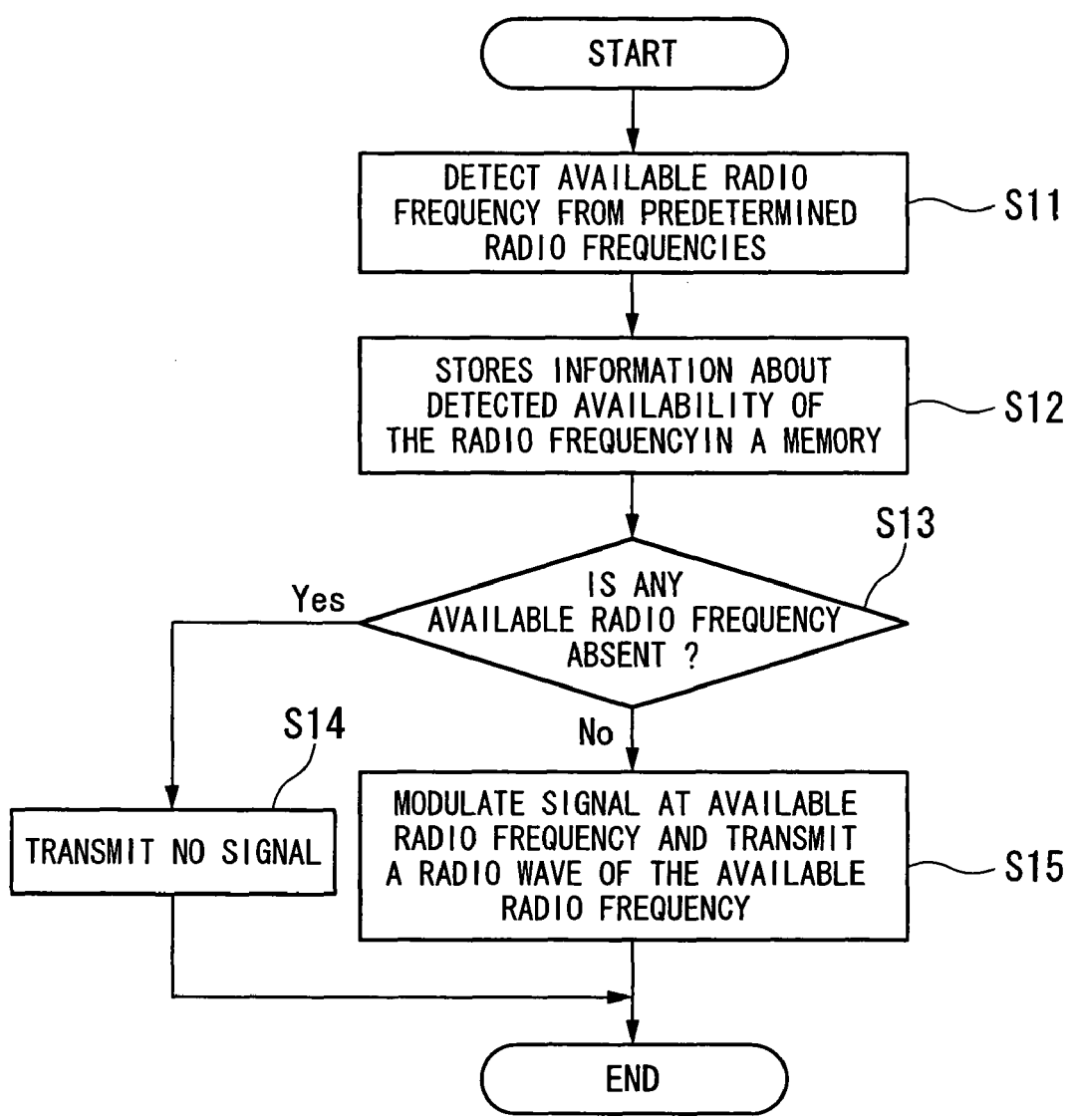
FIG. 3 is a flowchart illustrating sequential operations of the transmitting unit included in the communication terminal of FIG. 1.

As shown in FIG. 3, in Step S11, the transmitting unit 23 detects a radio frequency that stands not used by and is available to the other communication terminal 1B from a plurality of radio frequencies CH1, CH2, CH3, - - -, and CHN that are predetermined in accordance with the communication protocol. Each of the radio frequencies CH1, CH2, CH3, - - -, and CHN is allocated to one user. The transmitting unit 23 confirms sequentially whether each of the radio frequencies CH1, CH2, CH3, - - -, and CHN is available to and stands not used by the other communication terminal 1B. In order to confirm the availability of each of the radio frequencies CH1, CH2, CH3, - - -, and CHN, the transmitting unit 23 can monitor an RSSI (Received Signal Strength Indicator).

In Step S12, the transmitting unit 23 stores information about the confirmed availability in a memory.

In Step S13, the transmitting unit 23 verifies whether any available radio frequency is present or absent. In Step S14, if any available radio frequency is absent, then the transmitting unit 23 transmits no signal to the second antenna 21 through the antenna duplexer 22 so that the second antenna 21 transmits no radio wave. In Step S15, if an available radio frequency is present, the transmitting unit 23 modulates the signal from the MIMO base station 100 at the available radio frequency and sends the modulated signal through the antenna duplexer 22 to the second antenna 21 so that the second antenna transmits a radio wave of the available radio frequency toward the other communication terminal 1B. Thus, the first antenna 11 of the communication terminal 1A receives a signal that is transmitted from the MIMO base station 100. The received signal includes a signal for the other communication terminal 1B. The transmitting unit 23 of the communication terminal 1A transmits the signal for the other communication terminal 1B through the antenna duplexer 22 to the second antenna 21 so that the second antenna 21 of the communication terminal 1A transmits the radio wave of the available radio frequency toward the other communication terminal 1B.

The transmitting unit 23 may be permitted to use or share one of available radio frequencies for each of the communication terminals 1. In this case, if the transmitting unit 23 verifies that a plurality of available radio frequencies is present, then the transmitting unit 23 selects one of the plural available radio frequencies so that the second antenna 21 of the communication terminal 1A transmits the radio wave of the selected radio frequency toward the other communication terminal 1B.

As described above, the transmitting unit 23 receives the processed signal from the adaptive array processing and rake-synthesizing unit 13 before the transmitting unit 23 transmits the signal of the available radio frequency through the antenna duplexer 22 to the second antenna 21. Namely, after the adaptive array processing and rake-synthesizing unit 13 has performed the adaptive array processing and the rake synthesis, then the transmitting unit 23 transmits the signal processed by the adaptive array processing and rake-synthesizing unit 13. It is possible as a modification for the transmitting unit 23 to transmit, to the second antenna 21, a signal that has not yet been processed by the adaptive array processing and rake-synthesizing unit 13.

Figure 4:
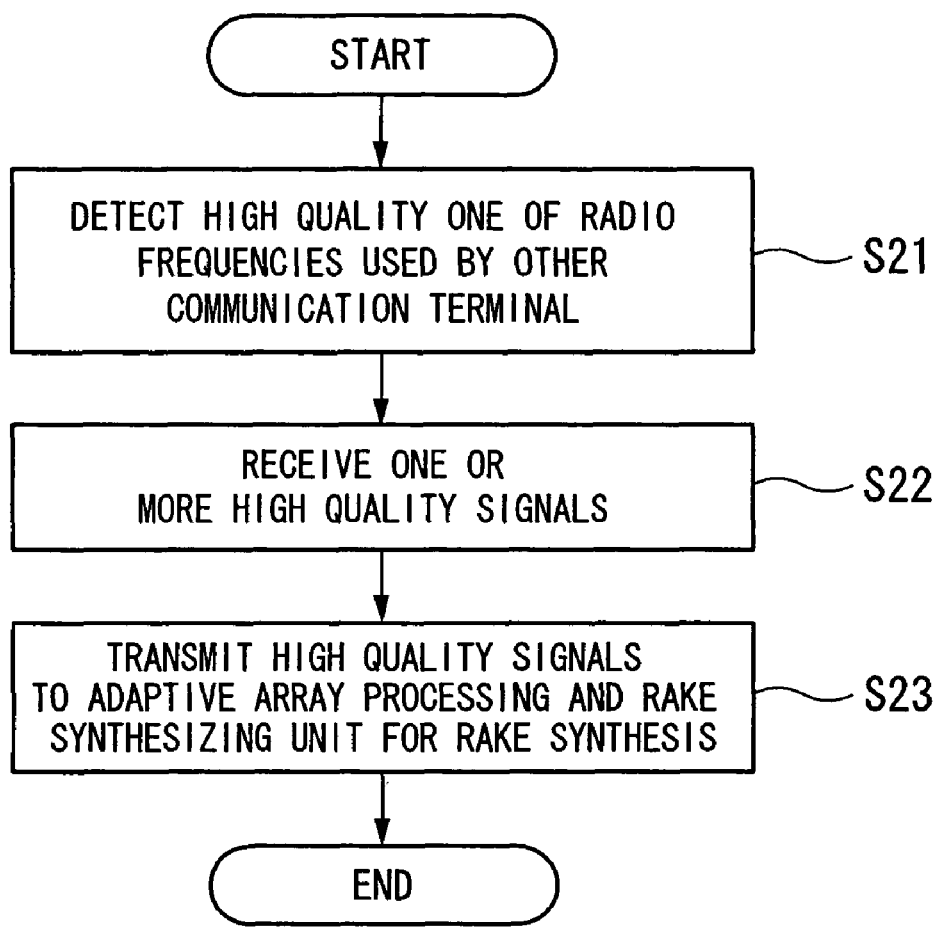
FIG. 4 is a flowchart illustrating sequential operations of the receiving unit included in the communication terminal of FIG. 1.

As shown in FIG. 4, in Step S21, the receiving unit 24 detects one high quality radio frequency that is shared and used by one or more other communication terminals 1(B). Preferably, the receiving unit 24 may detect the highest quality radio frequency. As described above, in Step S12 of FIG. 3, the transmitting unit 23 stores the information about the availability of each of the radio frequencies CH1, CH2, CH3, - - - , and CHN in the memory. In the detecting process, the receiving unit 24 reads out the information about the availability from the memory, so as to verify whether each of the radio frequencies is available or in use. The receiving unit 24 further inspects the quality of each of the received radio frequencies so as to select a high quality received radio frequency. Preferably, the receiving unit 24 selects the highest quality radio frequency.

In Step S22, the receiving unit 24 receives a high quality signal of the selected radio frequency.

In Step S23, the receiving unit 24 transmits the signal of the selected radio frequency to the adaptive array processing and rake-synthesizing unit 13 for rake synthesis so as to enable the adaptive array processing and rake-synthesizing unit 13 to perform the rake synthesis between the signal that has been transmitted from the other communication terminal 1B and the signal that has been transmitted from the MIMO base station. The above described configuration of the communication terminal 1A permits obtaining the signal for the communication terminal itself that was received and transmitted by the other communication terminal 1B. Namely, one of the communication terminals can establish not only a direct communication path between the one of the communication terminals and the base station but also another indirect communication path through a different one of the communication terminals between the one of the communication terminals and the base station. The above-described configuration of the communication terminal increases the number of the communication paths without increasing the number of the antenna elements thereof. The configuration of the communication terminal can establish the spatial paths between the communication terminal and the base station independently from the number of the antenna elements of the communication terminal. Increasing the number of the communication paths without increasing the number of the antenna elements of the communication terminal increases the rate of communication without increasing the scale or size of the communication terminal.

The above-described preferred embodiment can also be applicable to other systems such as the MISO system and the SIMO system.

As described above, each of the communication terminals 1 has the single first antenna element 11. It is possible as a modification for each of the communication terminals 1 to have a plurality of the first antenna elements, for example, two antenna elements, so as to establish another type of wireless communication with the base station using an adaptive array system.

As used herein and appended claims, the phrase "a first wireless communication terminal that communicates with the base station through a first signal" means that the first wireless communication terminal communicates with the base station by receiving and/or transmitting the first signal to the base station.

Also as used herein and amended claims, the phrase "a second wireless communication terminal that communicates with the base station through a second signal" means that the second wireless communication terminal communicates with the base station by receiving and/or transmitting the second signal to the base station.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A wireless communication terminal that communicates with a base station and a different wireless communication terminal, the wireless communication terminal comprising:
   first and second antennas;
   a base station communication unit that receives a first signal from the base station via the first antenna, the first signal to be used by the different wireless communication terminal; and
   a transmitting unit that receives the first signal from the base station communication unit and directly transmits the first signal to the different wireless communication terminal via the second antenna, wherein,
   the transmitting unit comprises a first detecting unit that detects a first radio frequency from a plurality of predetermined radio frequencies, the first radio frequency being not in use but available to the different wireless communication terminal, the transmitting unit transmitting the first signal at the first radio frequency to the different wireless communication terminal.

2. A wireless communication terminal that communicates with a base station and a different wireless communication terminal, the wireless communication terminal comprising:

first and second antennas;

a base station communication unit that receives a first signal from the base station via the first antenna;

a receiving unit that directly receives a second signal from the different wireless communication terminal via the second antenna, the second signal being not in use but available to the wireless communication terminal; and a signal synthesizing unit that receives the second signal from the receiving unit and performs at least one synthesis based on the first signal and the second signal, wherein the receiving unit comprises a first detecting unit that detects a first radio frequency, the receiving unit receiving the second signal at the first radio frequency from the different wireless communication terminal.

* * * * *